(12) United States Patent
Shon et al.

(10) Patent No.: US 10,185,831 B2
(45) Date of Patent: Jan. 22, 2019

(54) METHOD AND SYSTEM FOR DETECTING VULNERABILITIES OF COMMUNICATION PROTOCOL SOFTWARE

(71) Applicant: AJOU UNIVERSITY INDUSTRY-ACADEMIC COOPERATION FOUNDATION, Suwon-si, Gyeonggi-do (KR)

(72) Inventors: Tae Shik Shon, Suwon-si (KR); Hyung Uk Yoo, Seoul (KR)

(73) Assignee: AJOU UNIVERSITY INDUSTRY-ACADEMIC COOPERATION FOUNDATION, Suwon-si (KR)

( * ) Notice: Subject to any disclaimer, the term of this patent is extended or adjusted under 35 U.S.C. 154(b) by 130 days.

(21) Appl. No.: 15/200,051

(22) Filed: Jul. 1, 2016

(65) Prior Publication Data
US 2017/0124333 A1 May 4, 2017

(30) Foreign Application Priority Data
Oct. 28, 2015 (KR) .................. 10-2015-0150410

(51) Int. Cl.
*G06F 21/57* (2013.01)
*G06F 11/36* (2006.01)

(52) U.S. Cl.
CPC ........ *G06F 21/577* (2013.01); *G06F 11/3676* (2013.01); *G06F 11/3684* (2013.01); *G06F 2221/033* (2013.01)

(58) Field of Classification Search
CPC ............... G06F 21/577; G06F 11/3684; G06F 11/3676; G06F 2221/033
See application file for complete search history.

(56) References Cited

U.S. PATENT DOCUMENTS

| | | | | |
|---|---|---|---|---|
| 2004/0249779 A1* | 12/2004 | Nauck | ............... | G05B 13/0275 706/47 |
| 2009/0164478 A1* | 6/2009 | Natanov | ............ | G06F 11/3684 |
| 2012/0259576 A1* | 10/2012 | Thulasidasan | ...... | G06F 11/3684 702/123 |

FOREIGN PATENT DOCUMENTS

KR 10-2009-0044656 A 5/2009

OTHER PUBLICATIONS

Jong-Geun Jeong, et al., "Intrusion Detection System Model using agent learning in network", The Journal of the Korea Institute of Maritime Information and Communication Sciences vol. 6, No. 8 (2002).

(Continued)

*Primary Examiner* — Alexander Lagor
*Assistant Examiner* — Vu V Tran
(74) *Attorney, Agent, or Firm* — Sughrue Mion, PLLC

(57) ABSTRACT

According to an aspect of the inventive concept, there is provided a system for detecting vulnerabilities of communication protocol software, including: a field selection module selecting message fields of a communication protocol of an industrial control system; a value set configuration module configuring first value sets with respect to the respective message fields selected by the field selection module; a test case generation module generating first test cases by Cartesian product of the first value sets; a test module generating first code coverage data by testing the communication protocol software of the industrial control system based on the first test cases; and a code coverage analysis module analyzing the first code coverage data, wherein the field selection module selects concentration message fields which influence the first code coverage data among the message fields according to an analysis result of the code coverage analysis module.

5 Claims, 3 Drawing Sheets

(56) References Cited

OTHER PUBLICATIONS

Korean Office Action for corresponding Application No. 10-2015-0150410 dated Oct. 14, 2016.

\* cited by examiner

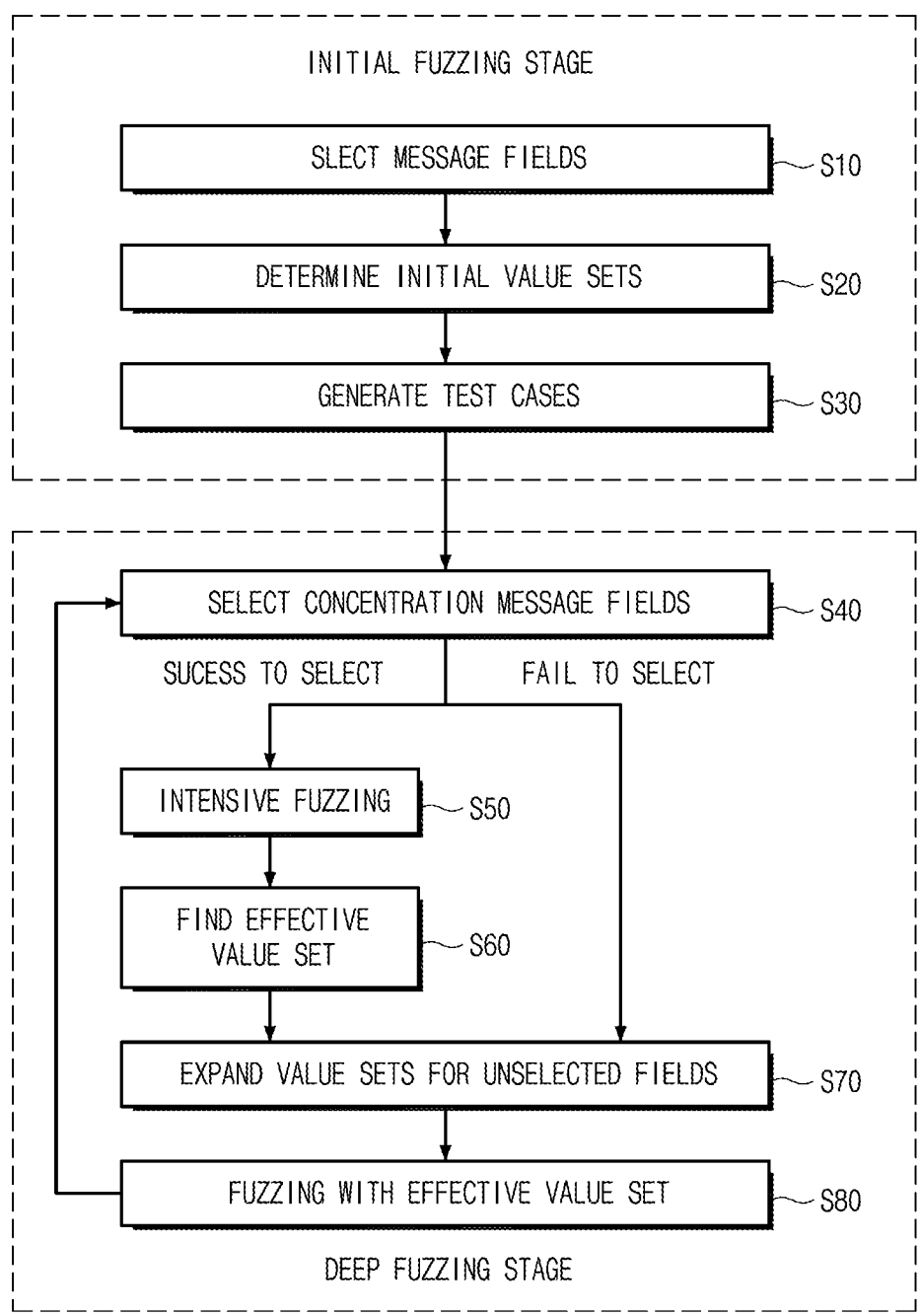

METHOD AND SYSTEM FOR DETECTING VULNERABILITIES OF COMMUNICATION PROTOCOL SOFTWARE

CROSS-REFERENCE TO RELATED APPLICATION

This application claims priority from Korean Patent Application No. 10-2015-0150410 filed on Oct. 28, 2015, in the Korean Intellectual Property Office, the contents of which are incorporated herein by reference in its entirety.

BACKGROUND

1. Field

The inventive concept relates to a method and a system for detecting vulnerabilities of communication protocol software, and more particularly, to a method and a system for detecting vulnerabilities of communication protocol software, which are used in an industrial control system.

2. Description of Related Art

An industrial control system means a computer-based system for monitoring and controlling each industrial process in industrial fields such as electricity, water, and gas. A supervisory control and data acquisition (SCADA) system or distributed control systems is one example of the industrial control system.

A communication protocol such as a distributed network protocol (DNP3) used in the industrial control system may be vulnerable to a cyber attack. Accordingly, a method and a system are required, which can efficiently detect vulnerabilities of communication protocol software used in the industrial control system in order to prevent the cyber attack.

SUMMARY

The inventive concept is directed to a method and a system for detecting vulnerabilities of communication protocol software capable of preventing an industrial control system attack attempted from cyber attackers using vulnerabilities of communication protocol software.

According to an aspect of the inventive concept, there is provided a system for detecting vulnerabilities of communication protocol software, comprising: a field selection module selecting message fields of a communication protocol of an industrial control system; a value set configuration module configuring first value sets with respect to the respective message fields selected by the field selection module; a test case generation module generating first test cases by Cartesian product of the first value sets; a test module generating first code coverage data by testing the communication protocol software of the industrial control system based on the first test cases; and a code coverage analysis module analyzing the first code coverage data, wherein the field selection module selects concentration message fields which influence the first code coverage data among the message fields according to an analysis result of the code coverage analysis module.

According to an exemplary embodiment, wherein the code coverage analysis module may classify the first code coverage data into a plurality of classes by using a K-means algorithm and analyzes the first code coverage data by performing a Chi-square test using the classified classes as variables.

According to an exemplary embodiment, the value set configuration module may configure second value sets having a larger range than the first value sets with respect to the concentration message fields, the test case generation module may generate second test cases by Cartesian product of the second value sets, and the test module may generate second code coverage data by testing the software based on the second test cases.

According to an exemplary embodiment, the code coverage analysis module may classify the second test cases into the plurality of classes according to the second code coverage data by using the K-means algorithm, and the value set configuration module may extract third value sets in the second test cases classified into high among the plurality of classes.

According to an exemplary embodiment, the value set configuration module may configure fourth value sets having a larger range than the first value sets with respect to residual message fields other than the concentration message fields among the message fields, and the test case generation module may generate third test cases by Cartesian product of the third value sets and the fourth value sets.

According to another aspect of the inventive concept, there is provided a method for detecting vulnerabilities of communication protocol software, comprising: generating first test cases by Cartesian product of first value sets configured with respect to respective message fields of a communication protocol of an industrial control system; generating first code coverage data by testing software of the communication protocol of the industrial control system based on the first test cases; selecting concentration message fields which influence the first code coverage data among the message fields according to the generated first code coverage data; generating second test cases by Cartesian product of second value sets having a larger range than the first value sets with respect to the concentration message fields; generating second code coverage data by testing the software based on the second test cases; classifying the second test cases according to the second code coverage data; extracting third value sets in the classified second test cases; configuring fourth value sets having a larger range than the first value sets with respect to residual message fields other than the concentration message fields among the message fields; and generating third test cases by Cartesian product of the third value sets and the fourth value sets.

According to an exemplary embodiment, wherein: the selecting of the concentration message fields may include, classifying the first code coverage data into a plurality of classes by using a K-means algorithm; performing a Chi-squared test using the classified classes as variables with respect to the respective message fields; and selecting the concentration message fields according to a result of the Chi-squared test.

According to an exemplary embodiment, wherein the selecting of the concentration message fields, the generating the second test cases, the generating of the second code coverage data, the classifying the second test cases, the extracting of the third value sets, the configuring of the fourth value sets, and the generating of the third test cases may be repeatedly performed until the vulnerabilities of the communication protocol software are detected.

In the method and the system for detecting vulnerabilities of communication protocol software according to the inventive concept, detecting effectively vulnerabilities of communication protocol software used in an industrial control system by selecting fields using code coverage data preferentially then performing in phase.

BRIEF DESCRIPTION OF THE FIGURES

Exemplary embodiments of the inventive concept will be more clearly understood from the following detailed description taken in conjunction with the accompanying drawings in which:

FIG. 3 is a flowchart for describing an operation of the system for detecting vulnerabilities of the communication protocol software illustrated in FIG. 2.

DETAILED DESCRIPTION OF THE EXEMPLARY EMBODIMENTS

Figure 1:
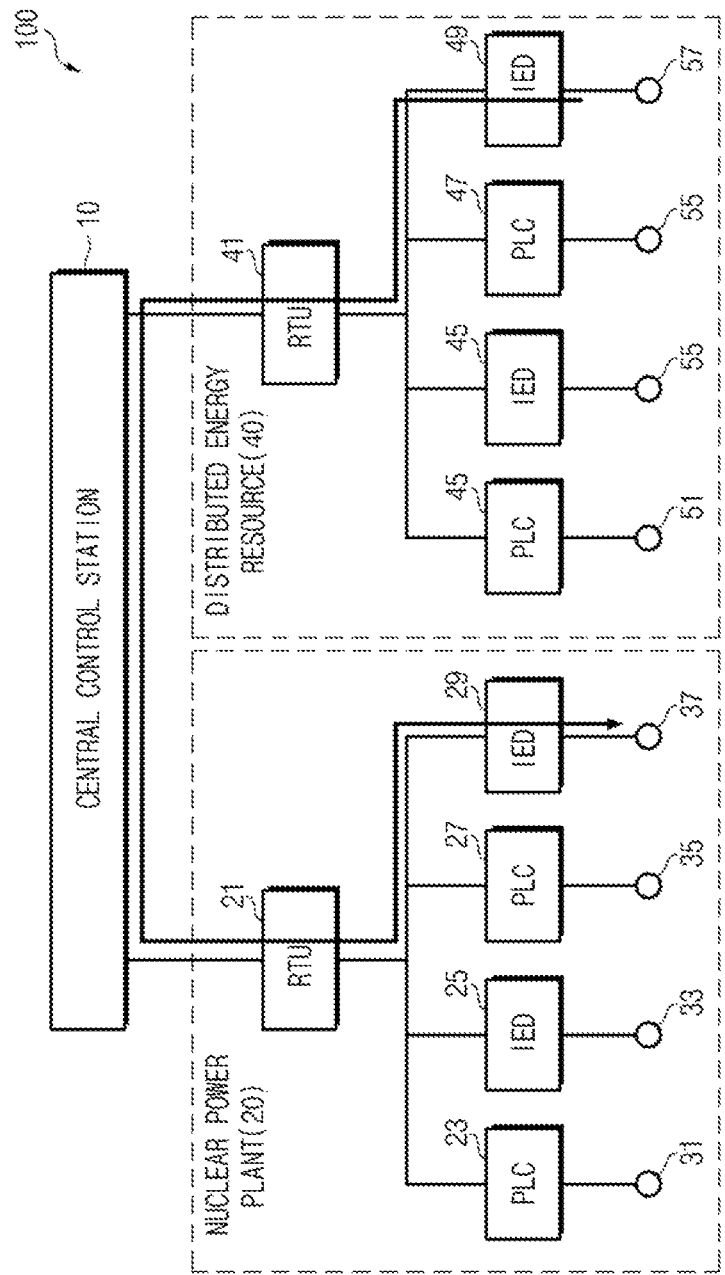
FIG. 1 is a block diagram of an industrial control system according to an exemplary embodiment of the inventive concept.

The inventive concept may be variously modified and have various exemplary embodiments, so that specific exemplary embodiments will be illustrated in the drawings and described in the detailed description. However, this does not limit the inventive concept to specific exemplary embodiments, and it should be understood that the inventive concept covers all the modifications, equivalents and replacements included within the idea and technical scope of the inventive concept.

In describing the inventive concept, in the following description, a detailed explanation of known related technologies may be omitted to avoid unnecessarily obscuring the subject matter of the inventive concept. In addition, numeral figures (for example, 1, 2, and the like) used during describing the specification are just identification symbols for distinguishing one element from another element.

Further, in the specification, if it is described that one component is "connected" or "accesses" the other component, it is understood that the one component may be directly connected to or may directly access the other component but unless explicitly described to the contrary, another component may be "connected" or "access" between the components.

In addition, terms including "unit", "er", "or", "module", and the like disclosed in the specification mean a unit that processes at least one function or operation and this may be implemented by hardware or software or a combination of hardware and software.

Moreover, it is intended to be clarified that distinguishing components in the specification just distinguishing the components for each primary function which each component takes charge of. That is, two or more components to be described below may be provided to be combined to one component or one component may be provided to be divided into two or more components for each more subdivided function. In addition, each of the respective components to be described below may additionally perform some or all functions among functions which other components take charge of in addition to a primary function which each component takes charge of and some functions among the primary functions which the respective components take charge of are exclusively charged by other components to be performed, of course.

Hereinafter, exemplary embodiments of the inventive concept will be sequentially described in detail.

FIG. 1 is a block diagram of an industrial control system according to an exemplary embodiment of the inventive concept.

Referring to FIG. 1, the industrial control system 100 includes a central control station 10, a nuclear power plant 20, and a distributed energy resource 40. According to the exemplary embodiment, the industrial control system 100 may include the nuclear power plant 20 or the distributed energy resource 40. Further, according to another exemplary embodiment, the industrial control system 100 may include an industrial resource such as electricity, water, oil, or gas.

The central control station 10 may control the nuclear power plant 20 or the distributed energy resource 40 through communication with the nuclear power plant 20 or the distributed energy resource 40.

Each of the nuclear power plant 20 and the distributed energy resource 40 may include remote terminal units (RTUs) 21 and 41, programmable logic controllers (PLCs) 23, 27, 43, and 47, intelligent electronic devices (IEDs) 25, 29, 45, and 49, and sensors 31, 33, 35, 37, 51, 53, 55, and 57. According to the exemplary embodiment, each of the nuclear power plant 20 and the distributed energy resource 40 may be constituted by the RTUs 21 and 41 and the sensors 31, 33, 35, 37, 51, 53, 55, and 57.

The sensors 31, 33, 35, 37, 51, 53, 55, and 57 may be used to collect predetermined information data associated with the electricity, water, oil, or gas or monitor a surrounding environment for warning alarm. The sensors 31, 33, 35, 37, 51, 53, 55, and 57 may be connected with the PLCs 23, 27, 43, and 47 and the IEDs 25, 29, 45, and 49. The PLCs 23, 27, 43, and 47 may convert an analog signal output from the sensors 31, 33, 35, 37, 51, 53, 55, and 57 into digital data. The IEDs 25, 29, 45, and 49 may receive a signal output from the sensors 31, 33, 35, 37, 51, 53, 55, and 57 and output a control signal.

The RTU 21 or 41 is connected with the central control station 10, the PLCs 23, 27, 43, and 47, and the IEDs 25, 29, 45, and 49. That is, the RTU 21 or 41 may transmit a digital signal output from the PLCs 23, 27, 43, and 47 to the central control station 10 or transmit the control signal generated by the IEDs 25, 29, 45, and 49 to the central control station 10. A communication protocol of the industrial control system between the RTU 21 or 41 and the central control station 10 may be, for example, a distributed network protocol (DNP3).

Hereinafter, the method for detecting the vulnerabilities of the communication protocol software of the industrial control system will be described by using the DNP3 as an example. The communication protocol software may be installed between the RTU 21 or 41 and the central control station 10 for industrial control system communication between the RTU 21 or 41 and the central control station 10.

Cyber attackers penetrate the IED 49 in the distributed energy resource 40 to hack or attack the inside (for example, the RTU 21 or the IED 29) of the nuclear power plant 20 by using the vulnerabilities of the communication protocol software installed in the RTU 21 or 41 and the central control station 10. Accordingly, the method for detecting the vulnerabilities of the communication protocol software of the industrial control system is required for preventing attacks of the cyber attacks.

Figure 2:
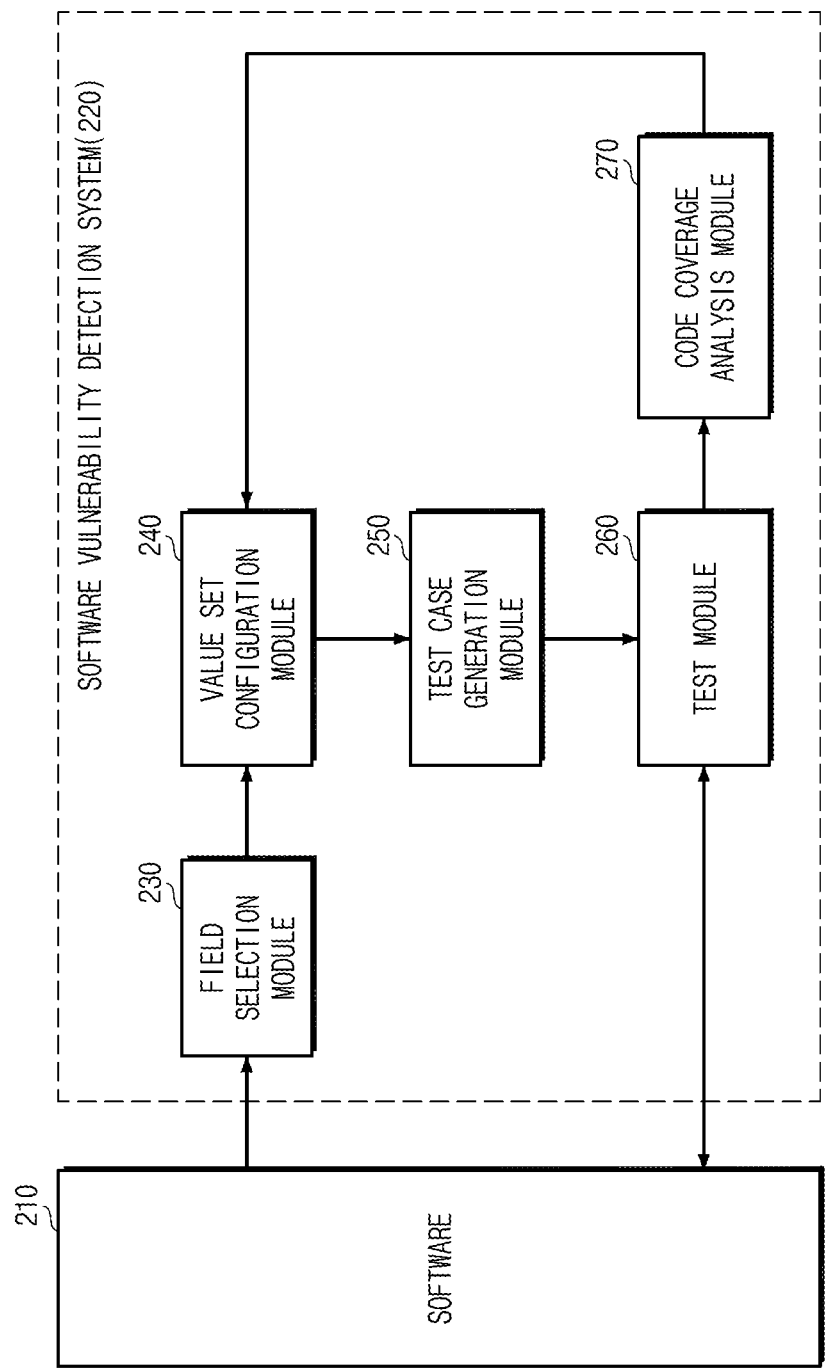
FIG. 2 a block diagram of a system for detecting vulnerabilities of communication protocol software of the industrial control system between a central control station and an RTU illustrated in FIG. 1.

FIG. 2 a block diagram of a system for detecting vulnerabilities of communication protocol software of the industrial control system between a central control station and an RTU illustrated in FIG. 1.

FIG. 3 is a flowchart for describing an operation of the system for detecting vulnerabilities of the communication protocol software illustrated in FIG. 2.

Referring to FIGS. 1 to 3, a system (hereinafter, referred to as a software vulnerability detection system) 220 for detecting vulnerabilities of the communication protocol software of the industrial control system is used for detecting the vulnerabilities of the communication protocol software 210 used in the industrial control system. The software 210 may be stored in the RTUs 21 and 41 and the central control station 10. The software vulnerability detection system 220 may be implemented as hardware or software.

The software vulnerability detection system 220 includes a field selection module 230, a value set configuration module 240, a test case generation module 250, a test module 260, and a code coverage analysis module 270.

In the specification, a module may mean a functional or structural combination of hardware for performing the technical spirit according to the exemplary embodiment of the inventive concept and software for driving the hardware. For example, the module may mean a logical or functional unit of a predetermined program code and a hardware resource for performing the program code and does not particularly mean a physically connected program code or one type of hardware.

The field selection module 230 selects message fields of the communication protocol of the industrial control system 100 in order to test the software 210. For example, when the communication protocol of the industrial control system 100 is the DNP3, the field selection module 230 may arbitrarily select N message fields FF1, FF2, . . . , and FFn among the message fields. The message fields may be a function code or an object group.

The value set configuration module 240 configures initial value sets (alternatively, first value sets) with respect to the respective selected message fields in the field selection module 230 (S20). The initial value sets IVSk (herein, k is a natural number) are a union of ineffective value sets VFFk, ineffective value sets IFFk, and boundary value sets BFFk. For example, a first effective value set VFF1 is {0~10, 129~130}, a first ineffective value set IFF1 is {49, 79, 91, 159, 252}, and a first boundary value set BFF1 is {0~2, 253~255}, a first initial value set IVS1 is {0~10, 49, 79, 91, 129~130, 159, 252~255} which is a union of the first effective value set VFF1, the first ineffective value set IFF1, and a first boundary value set BFF1.

The test case generation module 250 generates first test cases by Cartesian product of N (N is the natural number) first value sets (S30). For example, the first test cases may be generated as shown in Equation 1 given below.

TCS=IVS1×IVS2× . . . ×IVS$N$ [Equation 1]

Herein, TCS represents the first test case, IVS1, IVS2, . . . , and IVSN represent the initial value sets, respectively, and N is the natural number.

An initial fuzzing stage includes a message fields selecting operation S10, an initial value sets configuring operation S20, and a first test cases generating operation S30.

The test module 260 tests the communication protocol software 210 based on the first test cases to generate first code coverage data.

The code coverage analysis module 270 analyzes the generated first code coverage data. The field selection module 230 selects concentration message fields which influence the first code coverage data among the message fields according to the analysis.

In detail, the code coverage analysis module 270 classifies the first code coverage data into a plurality of classes (classes, for example, high, medium, and low) by using a K-means algorithm. The code coverage analysis module 270 performs a Chi-squared test using the classified classes as variables with respect to the respective message fields as shown in Equation 2 given below.

$$x^2(VSk, CC) = \sum_{e \in VSk} \sum_{c \in CC} \frac{(Nec - Eec)^2}{Eec}$$ [Equation 2]

Where, VSk represents a k-th message field, CC represents any one class of high, medium, and low, Nec represents an observed frequency, Eec represents an expected frequency, e represents elements of a VSk set, and c represents elements of a CC set.

The field selection module 230 selects concentration message fields which influence the first code coverage data among the message fields according to the test result.

When concentration message fields are successfully selected according to the field selection module 230, the value set configuration module 240 configures second value sets having a larger range than the first value sets with respect to the concentration message fields. For example, when the first value sets are {0~10, 49, 79, 91, 129~130, 159, 252~255}, the second value sets may be {0~33, 49, 52, 63, 79, 83, 91, 107, 129~131, 159, 173, 250~255}. In this case, the effective value set VFF1 of the first value sets may be {0~10, 129~130}, the ineffective value set IFF1 of the first value sets may be {49, 79, 91, 159, 252}, the boundary value set BFF1 of the first value sets may be {0~2, 253~255}, the effective value set VFF2 of the second value sets may be {0~33, 129~131}, the ineffective value set IFF2 of the second value sets may be {49, 52, 63, 79, 83, 91, 107, 159, 173, 252}, and the boundary value set BFF2 of the second value sets may be {0~6, 250~255}.

The test case generation module 250 generates second test cases by Cartesian product of the second value sets similarly. The test module 260 tests the software 210 based on the second test cases to generate second code coverage data.

The code coverage analysis module 270 classifies the second code coverage data into high, medium, and low) according to the second code coverage data by using the K-means algorithm.

The value set configuration module 240 extracts third value sets in the second test cases classified into high (S60).

The value set configuration module 240 configures fourth value sets having a larger range than the first value sets with respect to residual message fields other than the concentration message fields among the message fields (S70).

The test case generation module 260 generates third test cases by Cartesian product of the third value sets and the fourth value sets (S80).

A deep fuzzing stage includes a concentration message fields selecting operation S40, a second code coverage data generating operation S50, a third value sets extracting operation S60, a fourth value sets configuring operation S70, and a third test cases generating operation S80.

The concentration message fields selecting operation S40, the second code coverage data generating operation S50, the third value sets extracting operation S60, the fourth value sets configuring operation S70, and the third test cases generating operation S80 are repeated until the vulnerabilities of the software 210 are discovered.

According to the exemplary embodiment, when the concentration message fields are not successfully selected in the concentration message fields selecting operation S40, the operation of the software vulnerability detecting system 220 stops. In detail, for example, when the concentration message fields selecting operation S40 is unsuccessful consecutively three times, the operation of the software vulnerability detecting system 220 may stop. However, the technical sprit of the inventive concept is not limited thereto and the number of selection failure times of the concentration message fields that decide stopping the operation of the software vulnerability detecting system 220 may be variously set according to a test environment, and the like.

Hereinabove, the inventive concept has been described with reference to the preferred embodiments of the inventive concept. However, it will be appreciated by those skilled in the art that various modifications and changes of the inventive concept can be made without departing from the spirit and the scope of the inventive concept which are defined in the appended claims and their equivalents.

What is claimed is:

1. A system for detecting vulnerabilities of communication protocol software, the system comprising:
   a field selection module selecting message fields of a communication protocol of an industrial control system;
   a value set configuration module configuring first value sets with respect to the respective message fields selected by the field selection module;
   a test case generation module generating first test cases by Cartesian product of the first value sets;
   a test module generating first code coverage data by testing the communication protocol software of the industrial control system based on the first test cases; and
   a code coverage analysis module analyzing the first code coverage data,
   wherein the field selection module selects concentration message fields which influence the first code coverage data among the message fields according to an analysis result of the code coverage analysis module,
   wherein the value set configuration module configures second value sets with respect to the concentration message fields, and a range of values included in the second value sets is greater than a range of values included in the first value sets,
   the test case generation module generates second test cases by Cartesian product of the second value sets, and
   the test module generates second code coverage data by testing the software based on the second test cases, and
   wherein the value set configuration module extracts third value sets by using the second test cases and configures fourth value sets with respect to residual message fields that are not selected as the concentration message fields among the message fields, and a range of values included in the fourth value sets is greater than the range of values included in the first value sets, and
   the test case generation module generates third test cases by Cartesian product of the third value sets and the fourth value sets,
   wherein the code coverage analysis module classifies the first code coverage data into a plurality of classes by using a K-means algorithm and analyzes the first code coverage data by performing a Chi-square test using the classified classes as variables.

2. The system of claim 1, wherein:
   the code coverage analysis module classifies the second test cases into the plurality of classes according to the second code coverage data by using the K-means algorithm, and
   the value set configuration module extracts the third value sets in the second test cases classified into high among the plurality of classes.

3. A method for detecting vulnerabilities of communication protocol software, the method comprising:
   generating first test cases by Cartesian product of first value sets configured with respect to respective message fields of a communication protocol of an industrial control system;
   generating first code coverage data by testing software of the communication protocol of the industrial control system based on the first test cases;
   selecting concentration message fields which influence the first code coverage data among the message fields according to the generated first code coverage data;
   generating second test cases by Cartesian product of second value sets with respect to the concentration message fields, wherein a range of values included in the second value sets is greater than a range of values included in the first value sets;
   generating second code coverage data by testing the software based on the second test cases;
   classifying the second test cases according to the second code coverage data;
   extracting third value sets in the classified second test cases;
   configuring fourth value sets with respect to residual message fields that are not selected as the concentration message fields among the message fields, wherein a range of values included in the fourth value sets is greater than the range of values included in the first value sets; and
   generating third test cases by Cartesian product of the third value sets and the fourth value sets,
   wherein the selecting of the concentration message fields includes,
   classifying the first code coverage data into a plurality of classes by using a K-means algorithm; and
   performing a Chi-squared test using the classified classes as variables with respect to the respective message fields.

4. The method of claim 3, wherein:
   the selecting of the concentration message fields further includes
   selecting the concentration message fields according to a result of the Chi-squared test.

5. The method of claim 3, wherein the selecting of the concentration message fields, the generating the second test cases, the generating of the second code coverage data, the classifying the second test cases, the extracting of the third value sets, the configuring of the fourth value sets, and the generating of the third test cases are repeatedly performed until the vulnerabilities of the communication protocol software are detected.

* * * * *